Figure 1:
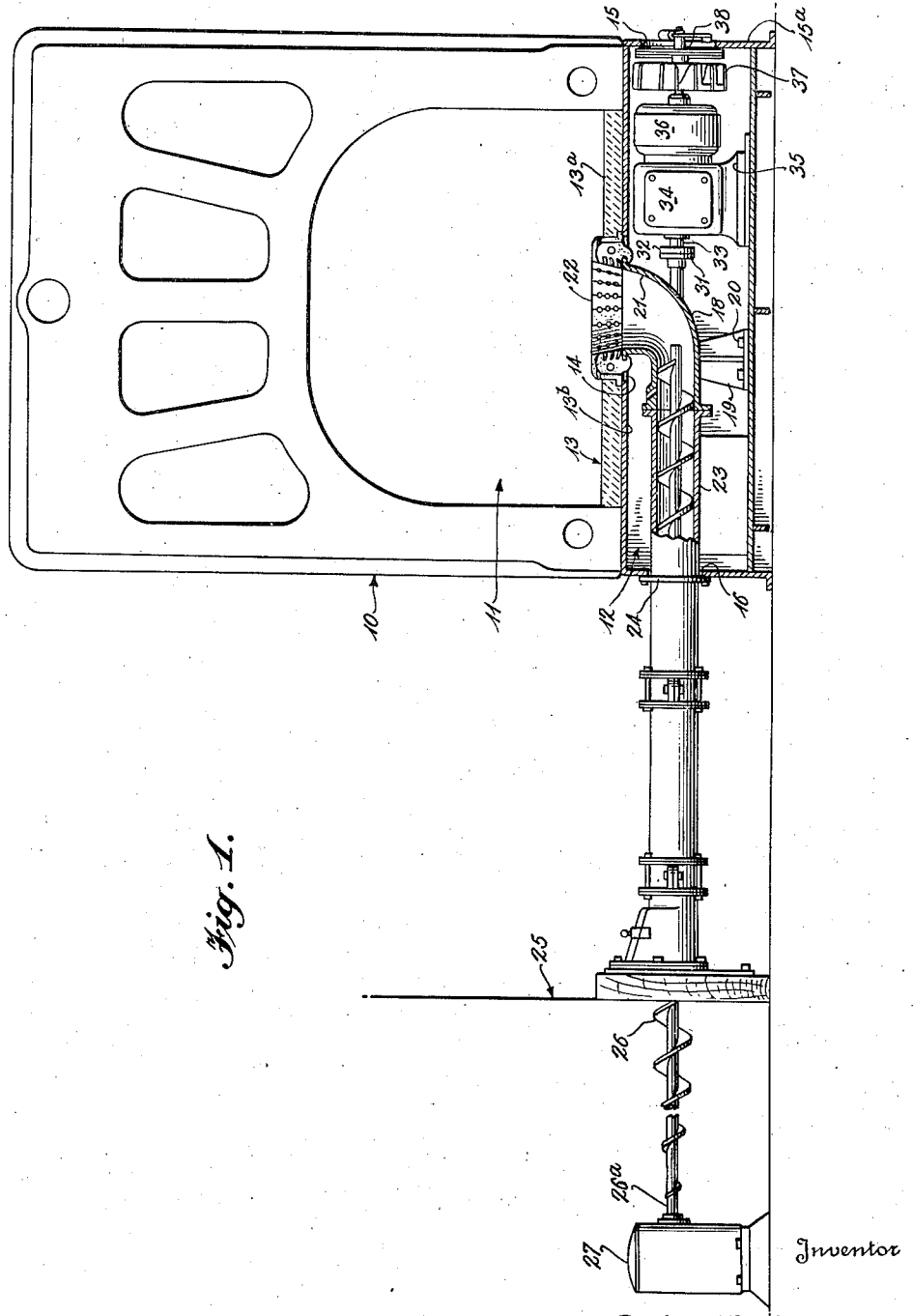

Jan. 4, 1949.  R. W. SUMAN  2,457,849
STOKER
Filed May 5, 1945  5 Sheets-Sheet 1

Inventor
Robert W. Suman
By L. Donald Myers
Attorney

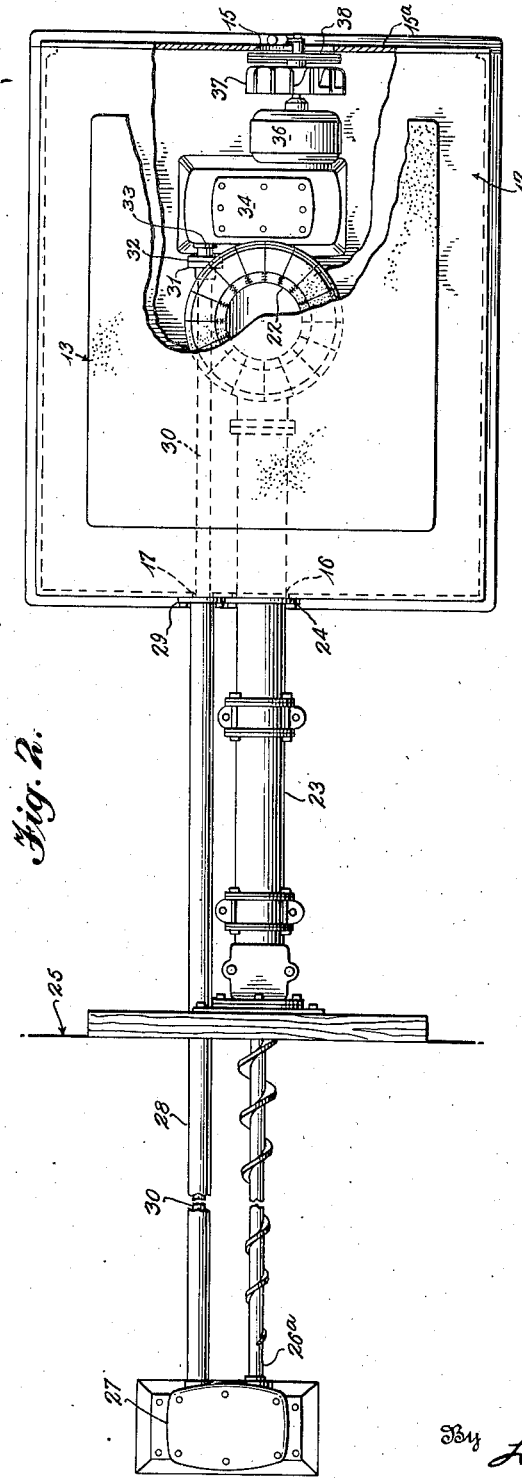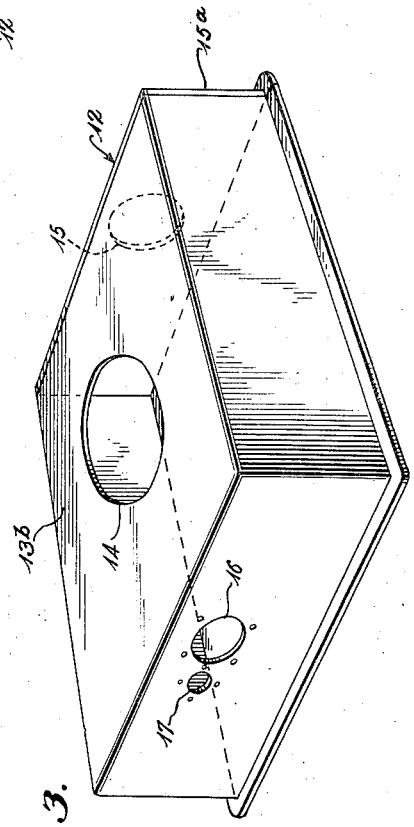

Jan. 4, 1949.  R. W. SUMAN  2,457,849
STOKER
Filed May 5, 1945  5 Sheets-Sheet 3
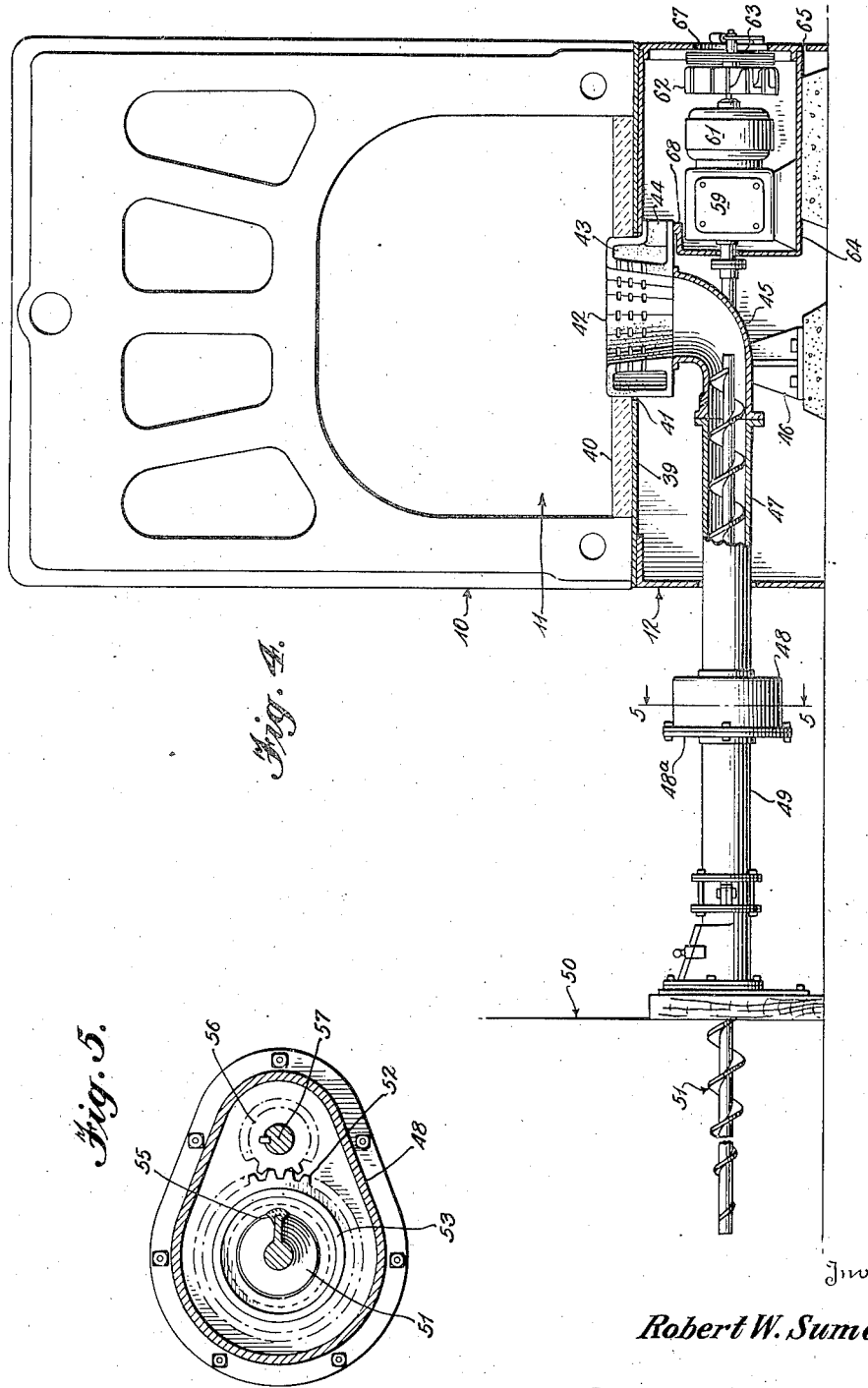
Inventor
Robert W. Suman
By [signature]
Attorney Jan. 4, 1949.                R. W. SUMAN                2,457,849
                               STOKER
Filed May 5, 1945                                5 Sheets-Sheet 4
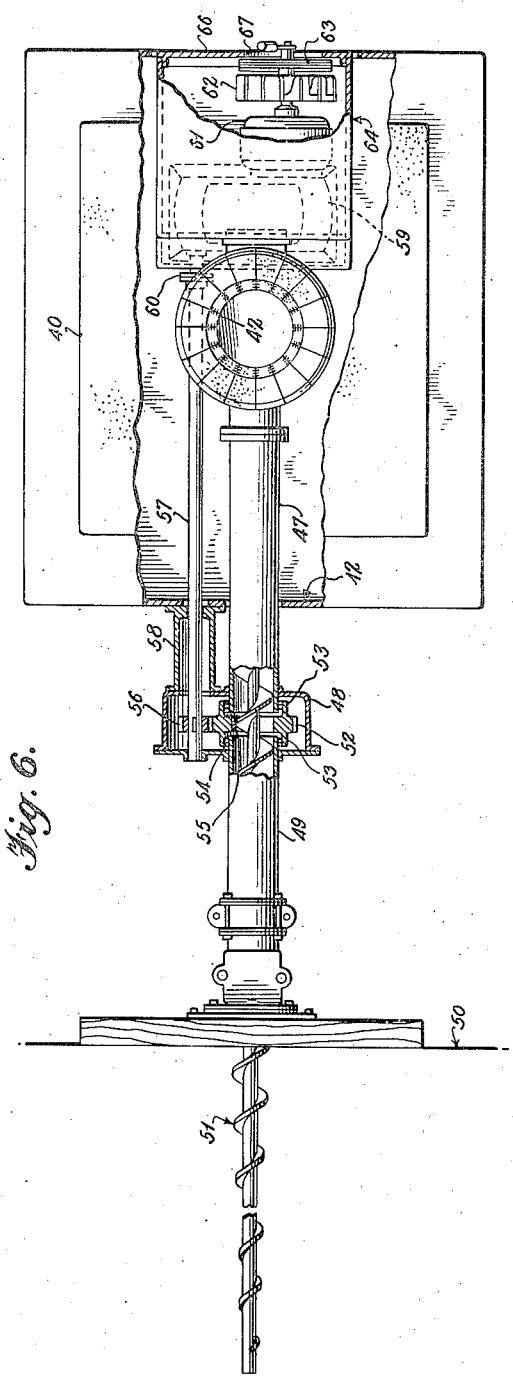
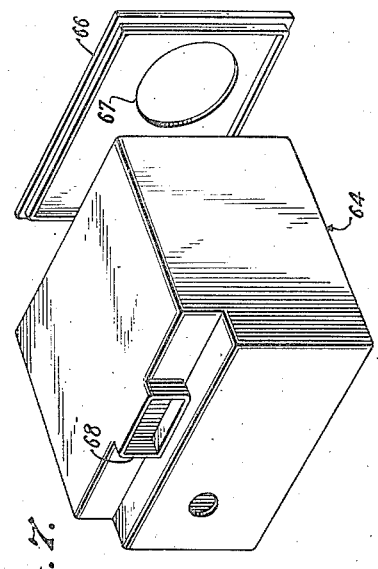
Inventor
Robert W. Suman

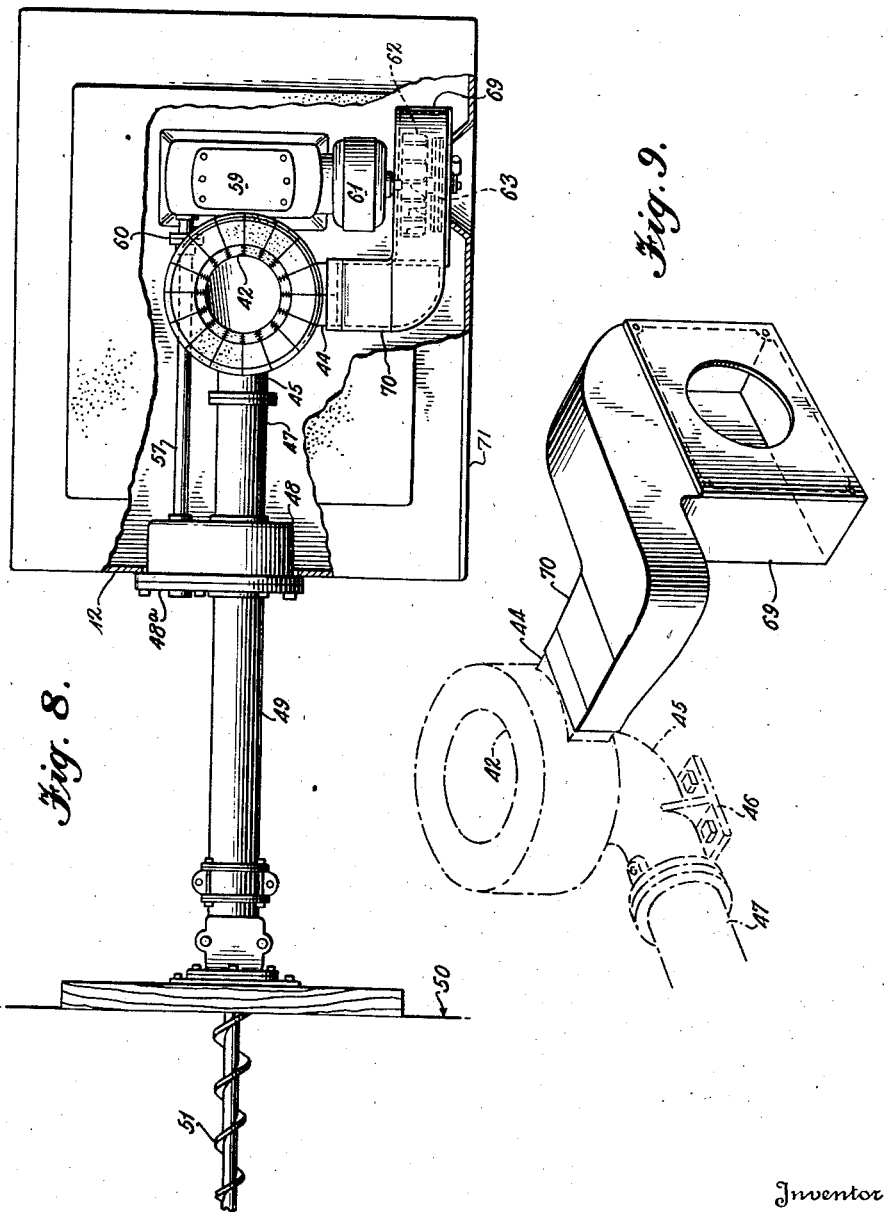

Patented Jan. 4, 1949

2,457,849

UNITED STATES PATENT OFFICE 2,457,849

STOKER

Robert W. Suman, Chicago, Ill., assignor, by mesne assignments, to Timken Silent Automatic Division, The Timken-Detroit Axle Company, Detroit, Mich., a corporation of Ohio Application May 5, 1945, Serial No. 592,133

21 Claims. (Cl. 110—45)

This invention relates to stokers which are particularly adapted for use with heating boilers and furnaces, and deals more particularly with improvements for stokers of the type disclosed and broadly claimed in my copending application, Serial No. 433,357, filed March 4, 1942, and issued on October 30, 1945, as Patent No. 2,387,781.

The subject matter of the above identified application is an innovation in the field of stokers for heating boilers and furnaces. The new principle involved consists of providing a stoker assembly which, with the exception of the fuel supply bin or hopper and a portion of the fuel conveyor, is installed within the base or ash pit of a heating boiler or furnace. Consequently, the floor space conventionally required for accommodating such exteriorly located equipment as a prime mover, a speed reducer unit, an encased apparatus for delivering air to the duct for the tuyère, special bases or mounts for the above devices, and suitable drive connections between the prime mover and the devices that are to be driven thereby is made available for other uses and the general appearance of the heating plants will be materially enhanced.

The specific apparatus that is illustrated in the aforesaid application constituted the best mode known at the time of filing for applying this broad principle. However, subsequent studies have resulted in the development of certain structural improvements which will be referred to herein.

In the copending application structure, the fuel feeding screw is illustrated as extending through the retort which is in line with the tube through exteriorly of the retort for connection with the speed reducer unit. Such a construction necessitates the provision of an opening in the wall of the retort which is in line with the tube through which the fuel is moved by the feed screw. Sealing of this opening against the passage of fine fuel particles, dust, and the like, presents an initial design and permanent maintenance problem.

It is a primary object of this invention to provide a drive connection between the speed reducer unit, that is located in the base of the heating furnace or boiler, and the fuel feeding screw which will eliminate the need for this troublesome drive connection accommodating opening in the retort.

The embodiment that is employed to illustrate the broad invention in the aforesaid application includes a prefabricated, box-like air duct that is placed in the base or ash pit of a heating boiler or furnace for housing the retort, the speed reducer unit, the air fan, and the prime mover. The last three mentioned devices are mounted on a common base plate so that they can be inserted and/or withdrawn relative to the air duct as a unitary assembly while permitting the prefabricated air duct and the retort to remain in the base of the boiler or furnace.

It is a further primary object of this invention to house or encase the retort, the speed reducer unit, the air fan, and the prime mover in the base of a heating boiler or furnace and employ either the said base or a relatively simple prefabricated duct structure as the air duct which provides the tuyère with the necessary combustion supporting air.

Still another primary object of the invention is to rigidly mount or anchor the retort directly in the base of a heating boiler or furnace and employ this anchored retort as a rigid support for the tuyère and the inner ends of the fuel feeding tube and screw. In the aforesaid application structure, it will be noted that the walls of the prefabricated, box-like air duct are illustrated as functioning to support the retort, the tuyère, and the inner ends of the fuel feeding tube and screw.

A more specific object of the invention is to encase the speed reducer unit, the prime mover, and the air fan in a housing that is removable as an assembly from the base of the boiler or furnace and employ the housing as an air duct for providing the tuyère with the necessary combustion supporting air.

Still another specific object of the invention is to encase only the air fan in an air duct and have this duct directly communicate with the tuyère.

Other objects and advantages of the invention will be apparent during the course of the following description.

In the accompanying drawings forming a part of this specification and in which like numerals are employed to designate like parts throughout the same, Figure 1 is a front elevational view of a boiler type of heating plant, with the front wall of the boiler casing removed, and with the base portion shown in vertical section, in which is installed a stoker assembly embodying this invention, Figure 2 is a top plan view, partly broken away, of the stoker and boiler arrangement illustrated in Fig. 1, Figure 3 is a detailed perspective view of the base of the boiler illustrated in Figs 1 and 2, Figure 4 is a similar view to Fig. 1 but illustrates a modification of the stoker assembly, Figure 5 is a detail vertical sectional view taken on line 5—5 of Fig. 4, Figure 6 is a top plan view, partly broken away, of the mechanism shown in Fig. 4, Figure 7 is a perspective view of the air duct that is employed as a part of the embodiment of the invention illustrated in Figs. 4 and 6, Figure 8 is a top plan view, partly broken away, of a further modification of the stoker assembly embodying this invention, and Figure 9 is a detail perspective view of a portion of the stoker assembly shown in Fig. 8.

In the drawings, wherein for the purpose of illustration are shown the preferred embodiments of this invention, and first particularly referring to Figs. 1 to 3 inclusive, the reference character 10 designates a conventional heating boiler. It is to be understood, however, that a conventional furnace could just as well have been selected to illustrate the heating plant portion of the mechanism. The boiler 10 is formed with a combustion chamber or fire box 11 and is mounted on means forming a closed base compartment 12. The top plate 13b of the base compartment 12 and the suitable cast refractory layer 13a can be considered as collectively forming a partition 13 that separates the combustion chamber 11 from the interior of the base compartment 12. In this specific construction, the base compartment 12 takes the place of the conventional ash pit. It is to be understood, however, that the conventional ash pit can be employed by removing the grates, if it is a conversion job, and substituting a metal plate and a refractory top layer to provide a partition between the interior of the base compartment and the combustion chamber. This alternate type of construction is illustrated in one of the other figures of the drawings.

The top plate 13b is provided with an opening 14 to accommodate a portion of the stoker in a manner to be described at a later point. Fig. 3 of the drawings illustrates this base compartment 12 as having an air inlet opening 15 formed in the removable side wall 15a while the diametrically opposite side wall is provided with openings 16 and 17 which accommodate portions of the stoker assembly in a manner to be described at a later point. By inspecting the several figures, it will be seen that the base compartment 12 is closed or sealed with the exception of the above enumerated openings 14 to 17 inclusive.

Positioned within the base compartment 12 is a retort 18 that is supported by the base 19 anchored to the floor or bottom of the base compartment 12 by suitable fastening devices 20. This retort 18 has supported on its discharge or delivery branch 21 a tuyère assembly 22 that is of annular formation to allow for the passage of fuel therethrough that is delivered thereto by the retort 18. This tuyère assembly 22, also, communicates with the interior of the base compartment 12 so that combustion supporting air can be fed to the fire bed, not shown, that will occupy the tuyère 22 when the stoker is in operation. It will be pointed out below that the tuyère receives the combustion supporting air from the interior of the base compartment 12.

The remaining branch of the retort 18 has suitably connected thereto, so as to be supported thereby, the discharge end of the fuel conveyor tube 23. This tube passes out of the base compartment 12 through the opening 16. A sealing ring 24 is employed for closing any clearance or gap that remains between the edge of the opening 16 and the periphery of the fuel tube 23. This fuel tube is of conventional construction and, for that reason, need not be described in detail. It extends to an exterior source of supply of the fuel. This supply source is generally designated by the reference character 25 and may take the form of a bin or a hopper. No attempt has been made to disclose in detail the construction of this supply source.

The fuel conveyor mechanism further includes the feed screw 26 that extends from within the bin or hopper 25 through the length of the fuel tube 23 to terminate within the retort 18.

The outer end of the shaft portion 26a of the feed screw 26 passes into a suitable gear box 27 and has a conventional spur gear, not shown, keyed thereon.

A tube 28 is illustrated in Fig. 2 as extending from the gear box 27 to the adjacent wall of the base compartment 12 and is connected to this wall by the mounting and sealing flange 29 that is concentrically arranged with respect to the opening 17, previously referred to. This tube 28 is employed for enclosing the drive or countershaft 30 that extends from within the gear box 27 to a location within the base compartment 12 in close proximity to the side of the retort 18. A suitable spur gear, not shown, is mounted on the end of the shaft 30 that is located within the gear box and this spur gear meshes with the gear mounted on the end of the screw shaft 26a.

The inner end of this drive or countershaft 30 has mounted thereon the element 31 of a conventional drive coupling which should be of the type that may be readily disconnected by relative axial movement of the second coupling element 32 with respect to the first mentioned coupling element 31. No attempt has been made to disclose any specific coupling construction as numerous couplings of this type are available on the open market. The second coupling element, which bears the reference numeral 32, is carried by the driven shaft 33 of the speed reducer unit 34. This speed reducer unit is provided with a mounting base 35 by means of which it is mounted on or supported by the floor or bottom of the base compartment 12. This base or mount 35 for the speed reducer unit 34 should be detachably anchored to the floor or bottom of the base compartment 12 so that the speed reducer unit may be removed from the base compartment by detaching the separable wall 15a of the base compartment. Any suitable, conventional speed reducing gear set, not shown, may be provided for the speed reducer unit 34.

A prime mover, such as an electric motor, 36 is illustrated as being mounted on and supported by the speed reducer unit 34. The armature shaft of this motor, of course, extends into the speed reducer unit casing for connection with the driving gear of this unit.

An air pressure fan 37 is mounted on the remaining end of the armature shaft of the motor 36 and is located inwardly of but axially aligned with the air inlet opening 15 of the base compartment 12. This fan is intended to create a static air pressure within the base compartment 12 when the motor 36 is energized. The development of a static air pressure within the base compartment will cause the tuyère 22 to be supplied with the necessary combustion supporting air for the fuel bed. The passage of air through the inlet opening 15 is controlled by a shutter mechanism 38 which may be either automatically or manually regulated.

The embodiment of the invention shown in Figs. 4 to 7 inclusive includes the heating boiler 10 that consists of the combustion chamber 11 and a conventional ash pit that cooperates with the extra plate 39 to form the base compartment 12. The plate 39 and the refractory layer 40 cooperate to form a partition between the combustion chamber 11 and the ash pit that has been converted to form the base compartment 12. An opening 41 is formed in plate 39 to accommodate the tuyère 42. By inspecting Fig. 4, it will be seen that this tuyère is constructed to provide the annular manifold portion 43 with the admission throat 44.

The tuyère 42 is mounted on and supported by the retort 45 having a base 46 by means of which it is anchored to the bottom or floor of the base compartment 12.

The fuel tube section 47 has one of its ends detachably connected to and supported by one of the branches of the retort 45. The remaining end of this fuel tube section is illustrated in Fig. 6 as passing into the gear box 48. A second fuel tube section 49 also has one of its ends passing into the gear box 48 while the remaining end is suitably connected to the fuel supply hopper or bin 50.

The fuel is conveyed from the bin or hopper 50 through the fuel tube sections 47 and 49 to the retort 45 by the feed screw 51. The delivery end of this feed screw is illustrated in Fig. 4 as terminating within the retort 45.

Figs. 5 and 6 illustrate the interior of the gear box 48. By inspecting Fig. 6, it will be seen that a ring gear 52 is positioned between the adjacent, spaced ends of the fuel tube sections 47 and 49. This ring gear has concentric flanges 53 projecting from opposite sides thereof and arranged to overlap the adjacent end portions of the fuel tubes 47 and 49. Suitable seals 54 are provided between these ring gear flanges 53 and the tube ends to prevent passage of fine coal particles or dust into the gear box 48 from the interior of the fuel tubes. Figs. 5 and 6 disclose the ring gear as being welded or brazed at 55 to the edge portion of the blade of the feed screw 51 to drivingly connect this ring gear to the feed screw.

A pinion 56 is suitably keyed to a drive or countershaft 57 that extends from the interior of the gear box 48 through the tube 58 to the interior of the base compartment 12. This drive or countershaft 57 is drivingly connected to the speed reducer unit 59 by the same type of detachable coupling 60 that is referred to in connection with the form of the invention shown in Figs. 1 to 3 inclusive, and identified by the reference characters 31 and 32.

The speed reducer unit 59, the prime mover or electric motor 61 and the air pressure fan 62 with its shutter mechanism 63 are the same type of units as are identified by the reference characters 34, 36, 37 and 38 in Figs. 1 and 2.

Instead of employing the base compartment 12 as the air duct for supplying air to the tuyère, as has been illustrated and described in connection with the embodiment of the invention shown in Figs. 1 to 3 inclusive, a prefabricated, box-like air duct 64 is employed. This box-like air duct encloses the speed reducer unit 59, the motor 61, the air pressure fan 62 and the shutter mechanism 63 and is adapted to be removed from the base compartment or ash pit 12 through the opening 65 formed in the side wall of the latter. Of course, when this air duct 64 is removed from the base compartment 12, the elements 59 to 63 are withdrawn with the air duct.

Figs. 4, 6 and 7 disclose the air duct 64 as having a detachable cover or face plate 66 which may be removed to provide access to the devices located within the duct. This cover or face plate is provided with an air inlet opening 67 that registers with the air pressure fan 62 and the passage of air through this opening 67 is controlled by the shutter mechanism 63. A suitable flanged opening 68 is formed in the air duct 64 and is intended to telescopically fit the throat 44 of the tuyère assembly 42. It will be appreciated that the air pressure fan 62 will build up a static pressure within the air duct 64, when the electric motor 61 is energized, and the tuyère assembly 42 will thus be provided with the necessary combustion supporting air for the fuel bed, not shown, that will occupy the bore of the tuyère.

The embodiment of the invention shown in Figs. 8 and 9 is very similar to the embodiment shown in Figs. 4 to 7 inclusive and for that reason the same reference characters will be employed wherever possible.

By inspecting Fig. 8, it will be noted that the gear box 48 is located for the most part within the base compartment 12, rather than being located intermediate this base compartment and the fuel supply bin or hopper 50. However, the detachable cover 48a of the gear box 48 is located exteriorly of the base compartment 12 so that access may be had to the interior of the gear box 48 without removing the latter from the base compartment of the heating plant.

Another modification that is incorporated in this embodiment of the invention consists of employing an air duct 69 that merely encases the air pressure fan 62 and the damper mechanism 63, instead of also encasing the speed reducer unit 59 and the electric motor 61. This air duct 69 includes a branch portion 70 that extends to and is telescopically fitted on the throat 44 of the tuyère assembly 42.

The side wall 71 of the base compartment 12 is made detachable, like the wall 15a of Figs. 1 to 3, to allow for the insertion and removal of stoker elements positioned in the base compartment 12.

In the above referred to figures, it will be noted that there are illustrated three different modifications or embodiments of air ducts supplying the necessary combustion supporting air to the tuyère and that each one of these embodiments includes at least a slightly modified form of drive between the speed reducer unit and the feed screw of the fuel conveyor mechanism. It will be understood by persons skilled in the art that each one of the three different drive mechanisms for the feed screws can be used with each one of the three different air duct embodiments of the invention. For that reason, it should not be necessary to pyramid or multiply the figures of the drawings to actually depict these obvious variations.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. The combination with a heating boiler or furnace having means forming a closed base compartment provided with openings in its side walls, a combustion chamber above the compartment, and a partition, having an opening, separating the compartment from the chamber, of a retort positioned in the base compartment, a tuyère supported on and communicating with the retort and communicating with the combustion chamber through the opening in said partition, a conveyor for delivering fuel to the retort extending through one of the side wall openings of the base compartment from an exterior source of supply, an air pressure fan registering with another of said side wall openings of the base compartment, mechanism for controlling the flow of air to the fan, means for conducting air from the fan to the tuyère, a prime mover in the base compartment drivingly connected to the fan, and transmission means extending from the prime mover to the fuel conveyor and connected to the latter at a point remote from the retort.

2. The combination with a heating boiler or furnace having means forming a closed base compartment provided with openings in its side walls, a combination chamber above the compartment, and a partition, having an opening, separating the compartment from the chamber, of a retort positioned in the base compartment, a tuyère supported on and communicating with the retort and communicating with the combustion chamber through the opening in said partition, a conveyor for delivering fuel to the retort extending through one of the side wall openings of the base compartment from an exterior source of supply, said conveyor comprising a fuel tube supported at its delivery end by the retort and a feed screw extending the length of the fuel tube and terminating in the retort, an air pressure fan registering with another side wall opening of the base compartment, mechanism for controlling the flow of air to the fan, means for conducting air from the fan to the tuyère, a prime mover in the base compartment drivingly connected to the fan, and transmission means extending from the prime mover to the fuel conveyor and connected to the latter at a point remote from the retort.

3. The combination with a heating boiler or furnace having means forming a closed base compartment provided with openings in its side walls, a combustion chamber above the compartment, and a partition, having an opening, separating the compartment from the chamber, of a retort positioned in the base compartment, a tuyère supported on and communicating with the retort and communicating with the combustion chamber through the opening in said partition, a conveyor for delivering fuel to the retort extending through one of the side wall openings of the base compartment from an exterior source of supply, a fan for supplying combustion air to the tuyère registering with another side wall opening of the base compartment, a prime mover in the base compartment drivingly connected to the fan, and transmission means extending from the prime mover to the fuel conveyor and connected to the latter at a point remote from the retort.

4. The combination with a heating boiler or furnace having means forming a closed base compartment provided with openings in its side walls, a combustion chamber above the compartment, and a partition, having an opening, separating the compartment from the chamber, of a retort positioned in the base compartment, a tuyère supported on and communicating with the retort and communicating with the combustion chamber through the opening in said partition, a conveyor for delivering fuel to the retort extending through one of the side wall openings of the base compartment from an exterior source of supply, said conveyor comprising a fuel tube supported at its delivery end by the retort, and a feed screw extending the length of the fuel tube and terminating in the retort, an air pressure fan registering with another side wall opening of the base compartment, mechanism for controlling the flow of air to the fan, means for conducting air from the fan to the tuyère, a prime mover in the base compartment drivingly connected to the fan, a speed reducer unit driven by the prime mover and having a drive shaft extending longitudinally of the fuel conveyor, and a transmission connection between said drive shaft and the feed screw remotely located with respect to the retort.

5. The combination with a heating boiler or furnace having means forming a closed base compartment provided with openings in its side walls, a combustion chamber above the compartment, and a partition, having an opening, separating the compartment from the chamber, of a retort positioned in the base compartment, a tuyère supported on and communicating with the retort and communicating with the combustion chamber through the opening in said partition, a conveyor for delivering fuel to the retort extending through one of the side wall openings of the base compartment from an exterior source of supply, said conveyor comprising a fuel tube supported at its delivery end by the retort, and a feed screw extending the length of the fuel tube and terminating in the retort, a fan for supplying combustion air to the tuyère registering with another side wall opening of the base compartment, a prime mover in the base compartment drivingly connected to the fan, and transmission means extending from the prime mover to the fuel conveyor and connected to the latter at a point remote from the retort.

6. The combination with a heating boiler or furnace having means forming a closed base compartment provided with openings in its side walls, a combustion chamber above the compartment, and a partition, having an opening, separating the compartment from the chamber, of a retort positioned in the base compartment, a tuyère supported on and communicating with the retort and communicating with the combustion chamber through the opening in said partition, a conveyor for delivering fuel to the retort extending through one of the side wall openings of the base compartment from an exterior source of supply, a fan for supplying combustion air to the tuyère registering with another side wall opening of the base compartment, a prime mover in the base compartment drivingly connected to the fan, a speed reducer unit driven by the prime mover and having a drive shaft extending longitudinally of the fuel conveyor, and a transmission connection between said drive shaft and the fuel conveyor remotely located with respect to the retort.

7. The combination with a heating boiler or furnace having means forming a closed base compartment provided with openings in its side walls, a combustion chamber above the compartment, and a partition, having an opening, separating the compartment from the chamber, of a retort positioned in the base compartment, a tuyère communicating with the combustion chamber through the opening in the partition and also communicating with the retort and the interior of the base compartment, a conveyor for delivering fuel to the retort extending through and closing one of the side wall openings of the base compartment from an exterior source of supply, said conveyor comprising a fuel tube supported at its delivery end by the retort, and a feed screw extending the length of the fuel tube and terminating in the retort, a fan for developing static air pressure in the base compartment registering with another opening in a side wall of said compartment, mechanism for controlling the flow of air to the fan, a prime mover in the base compartment drivingly connected to the fan, a speed reducer unit driven by the prime mover and having a drive shaft extending longitudinally of the fuel conveyor, and a transmission connection between said drive shaft and the feed screw remotely located with respect to the retort.

8. The combination with a heating boiler or furnace having means forming a closed base compartment and a combustion chamber above the base compartment, of a retort positioned in the base compartment, a tuyère communicating with the retort and with the combustion chamber, a conveyor for delivering fuel to the retort extending through a side wall of the base compartment from an exterior source of supply, an air duct, having an air inlet opening, removably positioned in the base compartment and detachably connected to the tuyère, a fan in the air duct and registering with its inlet opening, a prime mover in the air duct drivingly connected to the fan, and transmission means extending from the prime mover exteriorly of the air duct for connection with the fuel conveyor.

9. The combination with a heating boiler or furnace having means forming a closed base compartment and a combustion chamber above the base compartment, of a retort positioned in the base compartment, a tuyère communicating with the retort and with the combustion chamber, a conveyor for delivering fuel to the retort extending through a side wall of the base compartment from an exterior source of supply, said conveyor comprising a fuel tube connected to the retort at its discharge end, and a feed screw extending the length of the fuel tube and terminating in the retort, an air duct, having an air inlet opening, removably positioned in the base compartment and detachably connected to the tuyère, a fan in the air duct and registering with its inlet opening, a prime mover in the air duct drivingly connected to the fan, a speed reducer unit in the air duct driven by the prime mover and having a drive shaft extending outside of the air duct, and a transmission connection between the outer end of the drive shaft and the feed screw of the conveyor.

10. The combination with a heating boiler or furnace having means forming a closed base compartment and a combustion chamber above the base compartment, of a retort positioned in the base compartment, a tuyère communicating with the retort and with the combustion chamber, a conveyor for delivering fuel to the retort extending from an exterior source of supply, said conveyor comprising a fuel tube connected to the retort at its discharge end, and a feed screw extending the length of the fuel tube and terminating in the retort, a prime mover in the base compartment, an air circulating fan in the base compartment and driven by the prime mover, an air duct, having an air inlet opening, encasing the fan and communicating with the tuyère, mechanism for controlling the flow of air through the inlet opening of the air duct, a speed reducer unit in the base compartment driven by the prime mover and having a drive shaft extending longitudinally of the fuel conveyor, and a transmission connection between the outer end of the drive shaft and the feed screw of the conveyor.

11. The combination with a heating boiler or furnace having means forming a closed base compartment and a combustion chamber above the base compartment, of a retort positioned in the base compartment, a tuyère communicating with the retort and with the combustion chamber, a conveyor for delivering fuel to the retort extending through a side wall of the base compartment from an exterior source of supply, said conveyor comprising a fuel tube connected to the retort at its discharge end, and a feed screw extending the length of the fuel tube and terminating in the retort, an air duct, having an air inlet opening, removably positioned in the base compartment and detachably connected to the tuyère, a fan in the air duct registering with its inlet opening, a prime mover in the air duct drivingly connected to the fan, a speed reducer unit in the air duct driven by the prime mover and having a drive shaft extending outside the air duct and the base compartment, and a transmission connection between the outer end of the drive shaft and an intermediate portion of the feed screw.

12. The combination with a heating boiler or furnace having means forming a closed base compartment and a combustion chamber above the base compartment, of a retort positioned in the base compartment, a tuyère communicating with the retort and with the combustion chamber, a conveyor for delivering fuel to the retort extending from an exterior source of supply, said conveyor comprising a fuel tube connected to the retort at its discharge end, and a feed screw extending the length of the fuel tube and terminating in the retort, a prime mover in the base compartment, an air pressure fan in the base compartment and driven by the prime mover, an air duct, having an air inlet opening, encasing the air fan and communicating with the tuyère, mechanism for controlling the flow of air through the inlet opening of the air duct, a speed reducer unit in the base compartment driven by the prime mover and having a drive shaft extending longitudinally of the fuel conveyor, a gear train drivingly connecting the outer end of the drive shaft and an intermediate portion of the feed screw, and a housing for the gear train having a removable cover accessible from the outside of the base compartment.

13. A fuel burner, comprising a retort having a base for anchoring it to a supporting surface, a tuyère supported on and communicating with the retort, a conveyor for delivering fuel to the retort, a speed reducer unit having a base for anchoring it to the supporting surface for and close to the retort, a prime mover supported by and outboard with respect to the speed reducer unit, said speed reducer unit having a drive shaft extending parallel to the fuel conveyor, a transmission connection between the outer end of the drive shaft and the fuel conveyor, an air pressure fan mounted on the prime mover shaft, and means for conducting air from the fan to the tuyère.

14. A fuel burner, comprising a retort having a base for anchoring it to a supporting surface, a tuyère supported on and communicating with the retort, a conveyor for delivering fuel to the retort, said conveyor comprising a fuel tube supported at its delivery end by the retort, and a feed screw extending the length of the fuel tube and terminating in the retort, a speed reducer unit having a base for anchoring it to the supporting surface for and close to the retort, a prime mover supported by and outboard with respect to the speed reducer unit, said speed reducer unit having a drive shaft extending parallel to the fuel conveyor, a transmission connection between the outer end of the drive shaft and the feed screw, an air pressure fan mounted on the prime mover shaft, and means for conducting air from the fan to the tuyère.

15. A fuel burner, comprising a retort having a base for anchoring it to a supporting surface, a tuyère supported on and communicating with the retort, a conveyor for delivering fuel to the retort, a speed reducer unit having a base for anchoring it to the supporting surface for and close to the retort, a prime mover supported by the speed reducer unit, said speed reducer unit having a drive shaft extending parallel to the fuel conveyor, a transmission connection between the outer end of the drive shaft and the fuel conveyor, an air pressure fan mounted on the prime mover shaft, an air duct, having an air inlet opening, encasing the fan and communicating with the tuyère, and shutter mechanism for controlling the flow of air through the inlet opening of the air duct.

16. A fuel burner, comprising a retort having a base for anchoring it to a supporting surface, a tuyère supported on and communicating with the retort, a conveyor for delivering fuel to the retort, a speed reducer unit having a base for anchoring it to the supporting surface for and close to the retort, a prime mover supported by the speed reducer unit, said speed reducer unit having a drive shaft extending parallel to the fuel conveyor, a transmission connection between the outer end of the drive shaft and the fuel conveyor, an air pressure fan mounted on the prime mover shaft, and an air duct, having an air inlet opening, encasing the speed reducer unit, the prime mover, and the fan and communicating with the tuyère.

17. A fuel burner, comprising a retort having a base for anchoring it to a supporting surface, a tuyère supported on and communicating with the retort, a conveyor for delivering fuel to the retort, said conveyor comprising a fuel tube supported at its delivery end by the retort, and a feed screw extending the length of the fuel tube and terminating in the retort, a speed reducer unit having a base for anchoring it to the supporting surface for and close to the retort, a prime mover supported by the speed reducer unit, said speed reducer unit having a drive shaft extending parallel to the fuel conveyor, a gear train drivingly connecting the outer end of the drive shaft and an intermediate portion of the feed screw, a housing for the gear train, an air pressure fan mounted on the prime mover shaft, and means for conducting air from the fan to the tuyère.

18. The combination with a heating boiler or furnace having means forming a base compartment and a combustion chamber above the base compartment, of a retort in the base compartment, a tuyère communicating with the retort and the combustion chamber, an air duct, having an air inlet opening, positioned in the base compartment with the tuyère, a fan in the air duct registering with its inlet opening, means for feeding fuel to the retort, and transmission means in the base compartment and housed partly in the air duct for driving the fuel feeding means and the fan.

19. The combination with a heating boiler or furnace having means forming a base compartment and a combustion chamber above the base compartment, of a retort positioned in the base compartment, a tuyère communicating with the combustion chamber and with the retort, a conveyor for delivering fuel to the retort extending from an exterior source of supply, a prime mover in the base compartment for driving the fuel conveyor, and means for delivering combustion supporting air to the tuyère driven by the prime mover, said air delivering means comprising a duct directly connected to the tuyère and having an air inlet opening, a fan in the duct in alignment with the inlet opening, and mechanism for controlling the flow of air through said air inlet opening.

20. In combination, a heating boiler or furnace having a combustion chamber formed therein, a hollow base for supporting the boiler or furnace, a fuel conveyor extending into the base from an exterior source of supply, a retort in the base connected to the conveyor to receive fuel therefrom, a tuyère communicating with the retort and the combustion chamber, a fan in the base for supplying combustion supporting air to the tuyère, a prime mover in the base drivingly connected to the fan, and transmission means between the prime mover and a portion of the fuel conveyor which is in advance of the connection between said conveyor and the retort.

21. In combination, a heating boiler or furnace having a combustion chamber formed therein, a hollow base for supporting the boiler or furnace having the top wall thereof, which has an opening therethrough, separating the hollow base from said combustion chamber, a retort positioned in the hollow base, a tuyère communicating with the combustion chamber through the opening in said top wall and also communicating with the retort and with the hollow base, a conveyor extending into the hollow base for delivering fuel to the retort from an exterior source of supply, a fan in the hollow base for developing static air pressure therein for supplying combustion supporting air to the retort, a prime mover in the hollow base drivingly connected to the fan, and a transmission connection between the prime mover and a portion of the fuel conveyor which is exterior of the hollow base.

ROBERT W. SUMAN.

REFERENCES CITED

The following references are of record in the file of this patent:

UNITED STATES PATENTS

| Number | Name | Date |
| --- | --- | --- |
| 2,387,781 | Suman | Oct. 30, 1945 |

Certificate of Correction

Patent No. 2,457,849.  January 4, 1949.

ROBERT W. SUMAN

It is hereby certified that errors appear in the printed specification of the above numbered patent requiring correction as follows:

Column 1, line 34, strike out the words "which is in line with the tube through" and insert instead *so as to have its driven end projecting*; column 12, line 2, before "with" insert *and communicating*;

and that the said Letters Patent should be read with these corrections therein that the same may conform to the record of the case in the Patent Office.

Signed and sealed this 24th day of May, A. D. 1949.

[SEAL]

THOMAS F. MURPHY,
*Assistant Commissioner of Patents.*